UNITED STATES PATENT OFFICE.

HORACE W. LASH, OF CLEVELAND, OHIO.

ELECTRIC SMELTING OF IRON OXIDS.

No. 924,676.  Specification of Letters Patent.  Patented June 15, 1909.

Application filed September 12, 1907. Serial No. 392,460.

*To all whom it may concern:*

Be it known that I, HORACE W. LASH, a citizen of the United States, residing at Cleveland, in the county of Cuyahoga and State of Ohio, have invented a certain new and useful Improvement in Electric Smelting of Iron Oxids, of which the following is a full, clear, and exact description.

My invention relates to the reduction of iron oxids and more particularly to the reduction of such oxids as iron sands or scale which have been heretofore handled with difficulty and without great profit. In my prior patent No. 856,351 of June 11, 1907 I described a method of smelting these oxids and obtaining the metal therefrom under the conditions which obtain in an electric furnace. Since applying for the before mentioned patent, I have discovered that an advantageous procedure in smelting these finely divided oxids in the electric furnace may be had by following the method which I describe below.

In carrying out my process I use a smelting mixture comprising finely divided iron oxid mixed with finely divided cast or pig iron and finely divided carbon, the proportions of the various ingredients being indicated below. I may also use in this smelting mixture a certain quantity of flux, and have found it advantageous to use a small quantity of sawdust or equivalent readily combustible material.

It is not inconsistent with my procedure to include in the charge, along with the aforesaid smelting mixture, scrap metal whenever the smelter desires to use the same. This is an advantageous fact, since, as is well known, there is ordinarily a considerable accumulation of scrap around most smelting plants. The smelting mixture, however, consisting of finely divided oxid of iron, finely divided cast or pig iron and finely divided carbon is the essential portion of the charge.

The oxid of iron employed in the smelting mixture is, as above stated, in finely divided condition and may be obtained from sand ores found in many localities. Iron scale may also be used, and the process is obviously well adapted for the employment of magnetic concentrates.

The metallic portion of the smelting mixture may be shotted or granulated cast or pig iron, or finely divided cast iron obtained from any source. It is, however, to be noted that this iron must be of the quality commonly designated as cast or pig iron, as distinguished from the ordinary run of scrap, wrought iron, or steel, since it is important that it contain a high percentage of metalloids or easily oxidizable metals, such as manganese, capable of uniting with the oxygen of the iron oxid in the mixture. The free carbon in the smelting mixture is preferably in the form of ordinary coke, and is finely ground, as are the other portions of the charge. The fluxes, when used, are of the ordinary sort, such as limestone or fluorspar, and the saw dust is, of course, finely divided in its ordinary state. The various constituents of the smelting mixture are intimately mixed in any suitable manner and a binder, such as coal tar pitch, may be added, if desired, in order that the mixture may be made into the form of briquets for the sake of ready handling.

The prepared mixture either in the form of lumps or briquets, or in a loose condition, is charged into a suitable electric furnace which may or may not in the first heat contain a quantity of pig iron, and the temperature is raised to a smelting heat. Under the influence of the heat, the saw dust, or equivalent readily combustible material, if present, disappears as such leaving the mass to a certain extent porous. Upon the continued application of heat, a portion of the carbon added and the metalloids and easily oxidizable metals contained in the finely divided cast iron of the smelting mixture unite with the oxygen of the oxid of iron, thus reducing the iron of such oxids to metallic condition. The flux present performs its usual function, and the entire quantity of iron, both such cast or pig iron as was originally present, and the iron reduced from the oxids, is found in the form of a fused bath.

Inasmuch as under the conditions prevailing in an electric furnace the carbon and the metalloids of the metal bath will not be burned away by any oxidizing heating flame, thus obviating the waste of these valuable reducing agents, the resulting bath will contain a high percentage of carbon and be easily fusible.

In following the procedure forming the subject of this application for patent, I tap a portion of the bath from the electric furnace into an adjacent refining furnace where the refinement of the metal and oxidation of the metalloids contained in the metal is pushed to the desired extent,—the finished metal being used for any purpose for which it may be suitable. I, however, leave a portion of the molten bath in the electric furnace, and while it is in this molten condition still retaining considerable carbon and other metalloids and while there is no substantial loss of heat about the furnace, I charge thereinto a fresh supply of the smelting mixture above described, either in the form of lumps, briquets or in loose condition. The furnace being already at a high temperature and the bath of retained metal containing oxidizable metalloids capable of aiding in reducing the iron oxid of the smelting mixture, it is found that within a short time the entire mixture is reduced and the heat again ready to be tapped so that a portion of it may be run into an adjacent furnace for further treatment, while a portion of the bath is again retained in the furnace and the smelting operation is continued in the same manner as before.

It is not material to my procedure whether the refining furnace, into which the tapped portion of the bath is placed for refinement, be an electric furnace or a gas fired furnace, or whether it be near or remote from the smelting furnace. It is also immaterial whether the unrefined metal be cast prior to being further refined or treated. But it is, obviously, commercially advantageous to run the hot metal into a gas fired furnace adjacent to the smelting furnace, and it is this practice which I prefer.

The smelting mixture which I employ may vary as to the proportions of its several ingredients; but the following is an example of a smelting mixture, which I find to be quite satisfactory.

| | |
|---|---|
| Oxid of iron | 54% |
| Cast iron borings | 27% |
| Crushed coke | 8% |
| Coal tar pitch | 4% |
| Saw dust | 4% |
| Crushed limestone | 3% |

Having thus described my invention, I claim:

1. A method of reducing iron oxids comprising charging a smelting mixture containing finely divided oxid of iron with finely divided cast iron and carbonaceous material into an electric furnace, subjecting the same to a smelting heat in a non-oxidizing atmosphere, tapping off a portion of the resulting bath and retaining a portion thereof in the furnace, and again charging such a smelting mixture into the furnace while the retained metal is in a molten condition.

2. A method of reducing iron oxids comprising the obtaining a bath of molten metal in an electric furnace, charging therein a smelting mixture comprising finely divided oxid of iron with finely divided cast iron and carbonaceous material, subjecting the mixture to a smelting heat in a non-oxidizing atmosphere, tapping off a portion of the resultant bath and retaining a portion thereof in the furnace, and charging such a smelting mixture as before described into the molten metal retained in the furnace.

3. A method of reducing iron oxids comprising charging a smelting mixture containing finely divided oxid of iron with finely divided cast iron and carbonaceous material into an electric furnace, subjecting the same to a smelting heat in a non-oxidizing atmosphere, tapping off a portion of the resulting bath while it still contains a considerable percentage of carbon and retaining a portion thereof in the furnace, and charging an additional quantity of a smelting mixture such as described into the furnace.

In testimony whereof, I hereunto affix my signature in the presence of two witnesses.

HORACE W. LASH.

Witnesses:
   H. R. SULLIVAN,
   E. B. GILCHRIST.